(12) United States Patent
Ohlsson et al.

(10) Patent No.: US 7,411,026 B2
(45) Date of Patent: Aug. 12, 2008

(54) POLYMERS OF ETHYLENE AND, OPTIONALLY, COPOLYMERIZABLE ESTERS, FILMS USING SUCH POLYMERS AND STRETCH HOOD PACKAGING PROCESSES USING SUCH FILMS

(75) Inventors: Stefan Bertil Ohlsson, Wespelaar (BE); Bart Lauwers, Schriek (BE); Jan C. Donck, Holsbeek (BE); Jef Vaes, Zonhoven (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 343 days.

(21) Appl. No.: 10/796,831

(22) Filed: Jul. 28, 2004

(65) Prior Publication Data

US 2005/0037219 A1 Feb. 17, 2005

(51) Int. Cl.
*C08F 218/04* (2006.01)
*C08F 210/02* (2006.01)
*C08F 2/38* (2006.01)

(52) U.S. Cl. .................. 526/331; 526/64; 526/329; 526/348

(58) Field of Classification Search ............... 526/329, 526/331, 64, 348
See application file for complete search history.

(56) References Cited

U.S. PATENT DOCUMENTS

| 3,029,230 | A | * | 4/1962 | Strauss | .................. 526/227 |
| 4,788,265 | A | | 11/1988 | Pfleger et al. | |
| 4,988,781 | A | * | 1/1991 | McKinney et al. | ........... 526/68 |
| 5,376,739 | A | | 12/1994 | Pfleger et al. | |
| 6,291,038 | B1 | | 9/2001 | Babrowicz | ................. 428/34.9 |
| 6,297,338 | B1 | | 10/2001 | Cotts et al. | |
| 6,306,986 | B1 | | 10/2001 | Teasley | |

FOREIGN PATENT DOCUMENTS

| EP | 0099646 | | 9/1986 |
| EP | 0 361 363 | | 4/1990 |
| EP | 0461667 | | 5/1995 |
| EP | 0928797 | A1 * | 7/1999 |
| EP | 0 985 687 | | 3/2000 |
| EP | 1 362 793 | | 11/2003 |
| JP | 2002/273842 | | 9/2002 |
| WO | WO 94/25495 | | 11/1994 |
| WO | WO 98/44011 | | 10/1998 |
| WO | WO 00/24793 | | 5/2000 |
| WO | WO00/37543 | | 6/2000 |
| WO | WO 01/18097 | | 3/2001 |

OTHER PUBLICATIONS

Ehrlich, Paul et al.; "*A Kinetic Study of the Oxygen-Initiated Polymerization of Ethylene*," Journal of Polymer Science, vol. 43, pp. 389-412, 1960.
Beasly, J. K,; "*Polymerization of High Pressure*," Comprehensive Polymer Science, vol. 3, pp. 273-282, 1989.
Marano, J. P. Jr. et al.; "*Polymerization at High Pressure*," High Pressure Technology vol. 61, 1977.
Rooney, J. G. et al.; "*On Line Determination by Light Scattering of Mechanical Degradation in the GPC Process*," pp. 207-235, 1981.
Luft, G.; "*Activation Volumes of Polymerization Reactions.*," Polymer Handbook, 2nd Edition, pp. II-453-459, 1975.
Ogo, Y.; "*Polymerization at High Pressure*," Macromol Chem. Phys., pp. 1-48, 1984.
Yamamoto, K. et al.; "*Rate Constant for Long-Chain Branch Formation in Free-Radical Polymerization of Ethylene*," J. Macromol Sci.-Chem., A13(8), pp. 1067-1080, 1979.
Ehrlich, P. et al.; "*Fundamentals of the Free-Radical Polymerization of Ethylene*," Adv. Polymer Science. vol. 7, pp. 386-448, 1970.
Goto, S. et al.; "*Computer Model for Commercial High-Pressure Polyethylene Reactor Based on Elementary Reaction Rates Obtained Experimentally*," Journal of Applied Polymer Science:Applied Polymer Symposium vol. 36, pp. 21-40, 1981.
Luft, G. et al.; Makromol. Chem., vol. 184, p. 207, 1983, (abstract).
Luft, G. et al., Makromol Chem., vol. 184, p. 849, 1983. (abstract).

* cited by examiner

*Primary Examiner*—Fred M Teskin

(57) ABSTRACT

Polymers comprising units derived from ethylene, said polymer having: a) a Melt Index of from 0.05 to 20 g/10 min. as determined by ASTM-1238 Condition E; b) at least 10 per 1000 C-atoms of short chain branches, containing five carbon atoms or less, as determined by C13 NMR, and less than 3.5 mol %, of units derived from a copolymerizable ethylenically unsaturated ester; c) a density of from 0.90 to 0.94 g/cm$^3$, preferably 0.91 to 0.935 g/cm$^3$, especially 0.92 to 0.93 g/cm$^3$ as determined by ASTM D1505; and d) a relaxation time as described herein of at least 10 s. Such polymers can be obtained by free radical polymerization using a chain transfer agent that incorporates into the polymer chain such as an alpha-olefin, preferably propylene, as a chain transfer agent, preferably in a tubular reactor under circumstances to favor LCB formation in a down stream part of the tubular reactor.

24 Claims, 9 Drawing Sheets

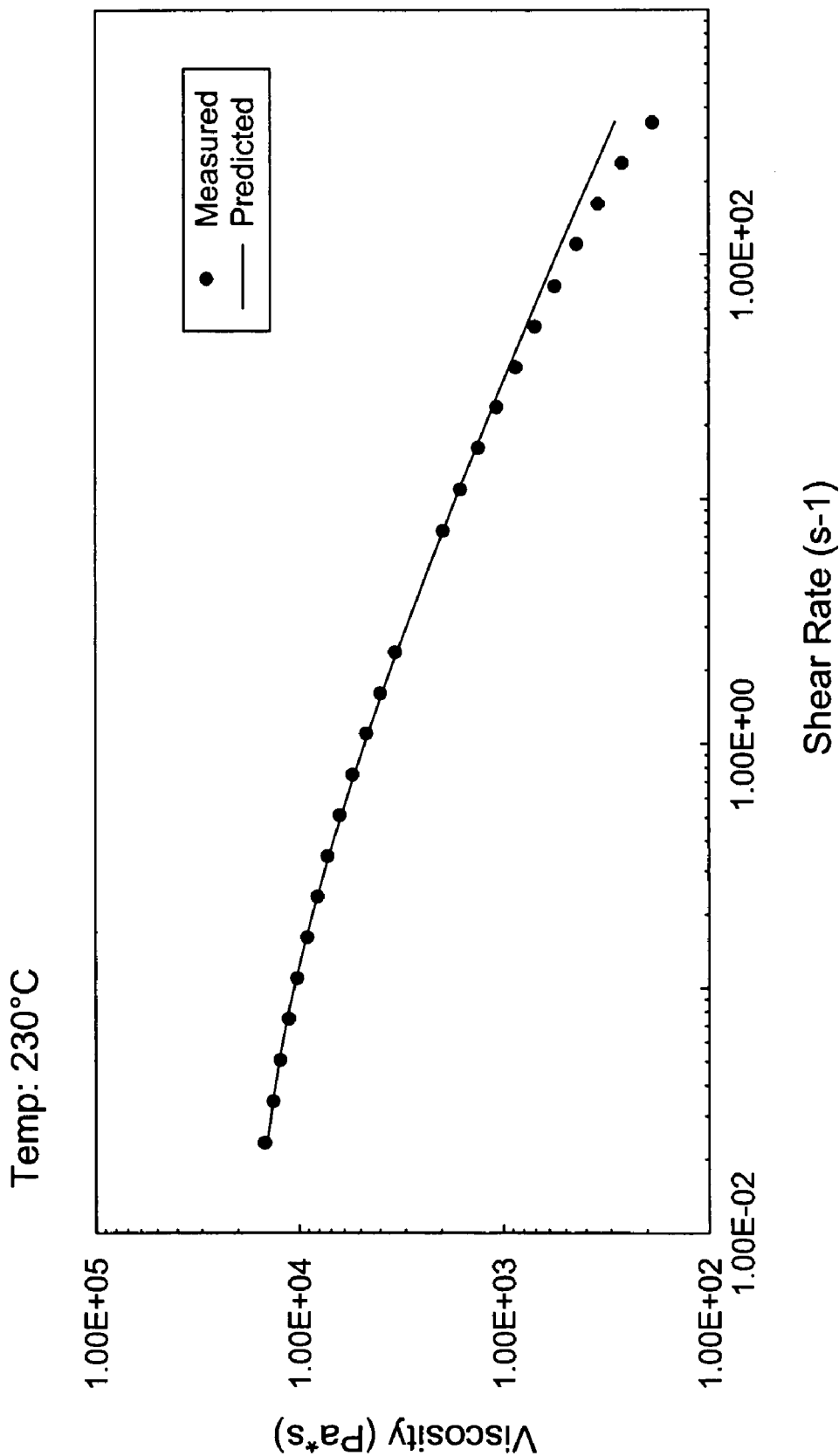

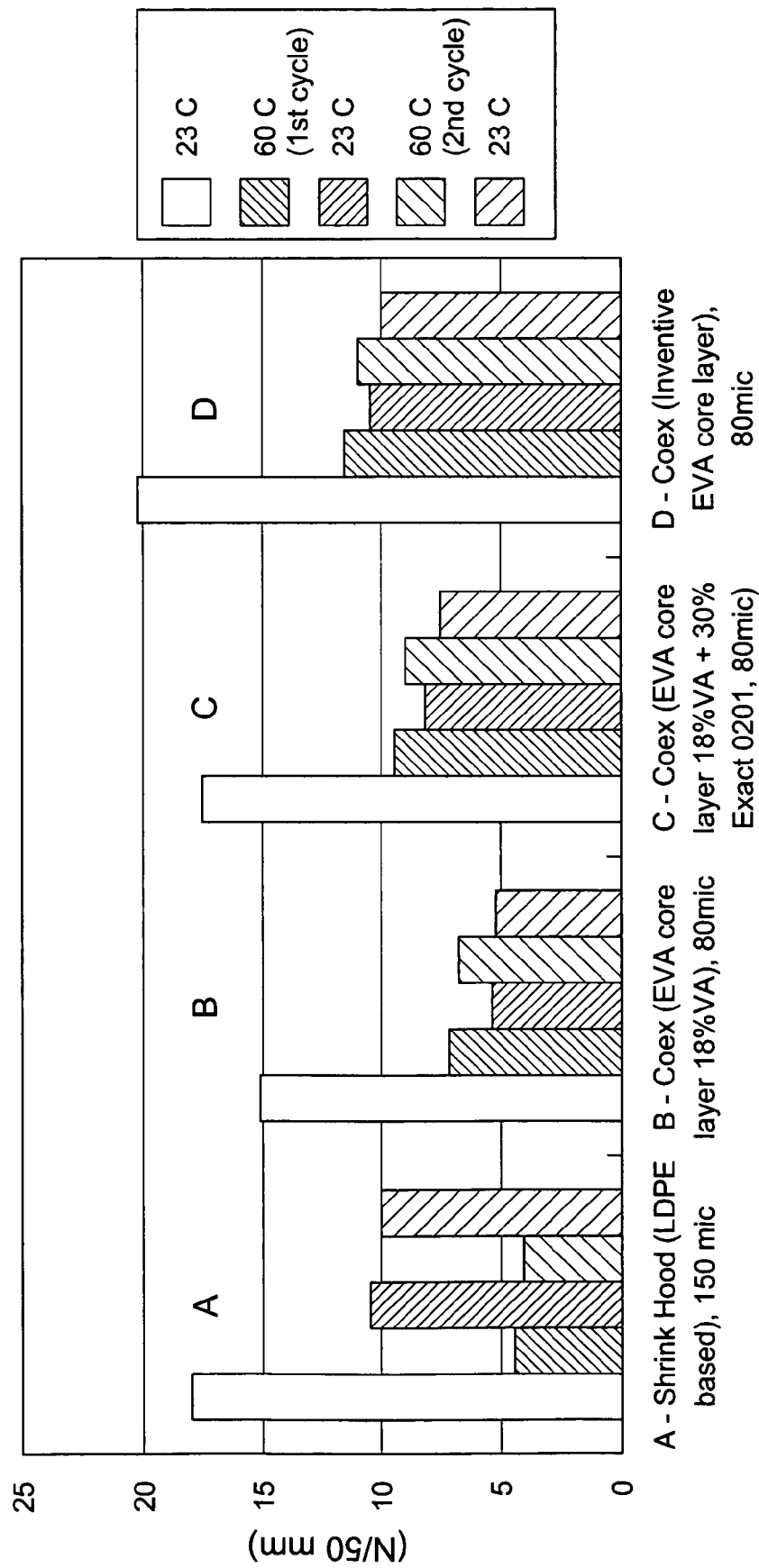

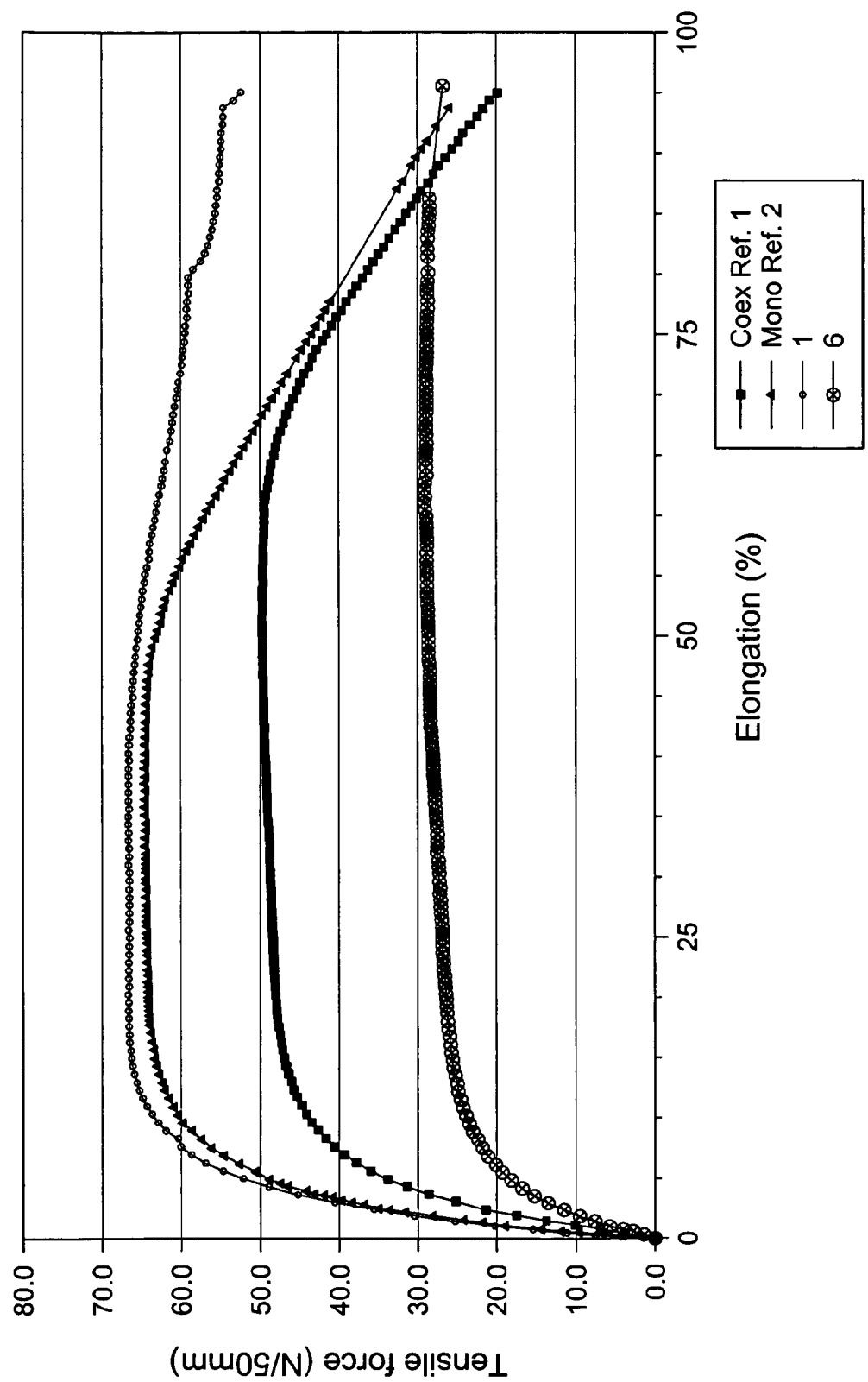

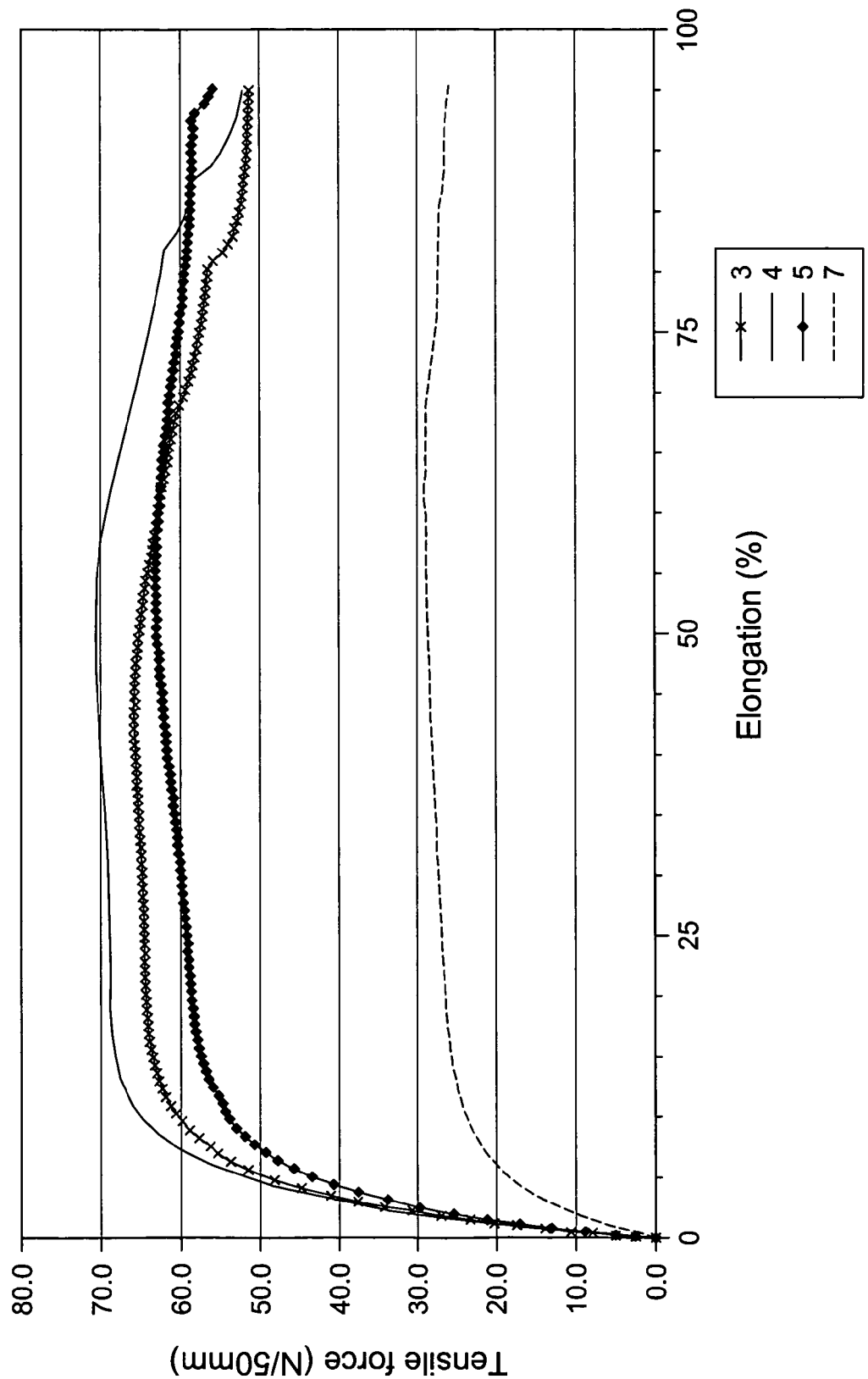

POLYMERS OF ETHYLENE AND, OPTIONALLY, COPOLYMERIZABLE ESTERS, FILMS USING SUCH POLYMERS AND STRETCH HOOD PACKAGING PROCESSES USING SUCH FILMS

FIELD OF INVENTION

The invention relates polymers of ethylene and, optionally, copolymerizable esters, to films using such polymers and stretch hood packaging process using such films. The films may, in one use, be employed to package an object or collection of objects generally supported on a pallet or other supporting platform for storage or transportation. The invention relates especially to cases where the polymer is an interpolymer of ethylene and a copolymerizable ester and to multi-layer films where a skin layer is provided on one or both sides of a core layer.

BACKGROUND OF THE INVENTION

The term stretch hood refers to one form of packaging system in which a film tube is used to form a hood to bundle and protect goods. The goods may be a single object such as white goods (a washing machine or refrigerator) or electronic goods. The goods may be a collection of objects such as bottles, bags of soil, cement, fertilizer, polymer pellets or concrete blocks, bricks, tiles, insulation materials. The object or objects are often supported on a pallet or other supporting platform, referred to herein as a palletized load, to permit handling by a forklift device. The film tube is conveniently produced by blown film extrusion, which may involve coextrusion, to produce a tube from an annular die. Using blown film extrusion, the extruded tube is flattened for later use without slitting it longitudinally. Stretch hood relies on elastic contraction of the film tube around the object or collection of objects to be packaged, after a stretching device has placed the tube in a stretched condition around the object or collection of objects to be packaged to form the hood. The hood protects, holds the palletized load together against spillage if necessary and shields the palletized load from damage and environmental factors (moisture) during transportation and storage. The hood may be sealed at one end to protect and cover the top of the palletized load. Alternatively, the hood may be open at the top where protection is a lower priority.

Stretch hood packaging systems may provide certain advantages over other forms of packaging of palletized loads such as shrink hood, where a film tube is shrunk by the application of heat, or stretch wrap where a flat film is wrapped around the object or collection of objects to be packaged. In shrink hood a film containing a highly oriented polymer (often LDPE with optionally some LLDPE) is melt oriented upon extrusion and shrinks and thickens when shrunk around and onto a palletized load. Heat has to be applied to shrink the film into the position where it provides the holding force that holds load together against spillage. The process consumes significant energy and the use of heat creates safety debits. The film is relatively thick and stiff and need not be designed to stretch easily prior to heat shrinking. In stretch wrap, a more linear polymer (often linear low-density polyethylene LLDPE with optionally some VLDPE (an ethylene copolymer of lower density than the LLDPE) is extruded to provide the required stretching characteristics. A tackifying polymer or other ingredients must be added to establish sufficient a cling force on the surface. The film can cling to itself strongly when rolled up (referred to as blocking) and excessive noise may result when unrolling the film at high speed. The film is relatively thin and designed to stretch easily to considerable levels of over 200% for its application around a load. The holding force is provided by the contracting force exerted by the stretched film. Stretch wrap is applied as a flat, non-tubular film and may give incomplete protection against environmental factors.

This invention concerns inter-polymers, and multi-layer films, which are described in terms of their utility for stretch hood applications. However these polymers and films may have performance features that provide utility elsewhere. Appropriate uses might be stretch sleeve to apply a label to a bottle or agricultural films for silage or greenhouse film or for collation shrink applications.

The application of a film tube to package the object or collection of objects on a stretch hood packaging machine involves the steps described by way of example in EP0461667 for the case where the top of the stretch hood is sealed.

In a first step (see FIGS. 1 and 2 of EP0461667) a flattened film tube is unrolled and opened up to fit around a stretcher, which may be in the form of a frame as shown or in the form of four corner devices as illustrated in FIG. 6. At this stage the top of the tube can be heat sealed before it is cut-off, creating an inverted bag. The stretcher device can enter the inverted bag from below. The film material is gathered around the stretcher by take down rollers at each corner (not shown in the Figures). The film is gripped in a nip between the stretcher and the rollers. The takedown rollers cause the film to be folded transversely and gathered on the stretcher. The film and rollers have to have enough friction for an efficient gathering and take down operation. The heat sealing at the top end of the tube requires high hot tack and seal strength to survive subsequent stretching. The gathered, transversely folded tube is then expanded by the stretcher in the transverse film direction beyond the external dimensions of the palletized load. This requires a pre-determined elasticity that permits stretching and a reversion of the stretch later upon relaxation (see FIG. 3 of EP0461667). The expanded stretcher with the transversely stretched film tube is then passed downwards over the palletized load unfolding and releasing the film (see FIG. 4 of EP0461667). This requires that the film tube, in its tensioned condition, has a moderate coefficient of friction with the stretcher to allow it to be released easily from the stretcher while at the same time submitting the film to a sufficient force in the machine direction to achieve a moderate degree of machine direction stretch. The stretcher remains in the expanded state after releasing the lower edge of the film hood and returns upwards to the starting positions past the hood, sealed at the top, now contracted around the palletized load.

Different film tube structures have been suggested for stretch hood. WO00/37543 discloses on a three-layer film using a blend of a metallocene produced plastomer (page 8, lines 10 to 16) and a predominant amount of ethylene (E) vinyl acetate (VA) with a high amount of VA in a core layer and surface layers of an EVA with low VA content containing $SiO_2$ as anti-block friction modifier. The term plastomer is used to indicate a low density copolymer of ethylene and α-olefins. The EVA polymers used in WO00/37543 are produced in a high-pressure process, generally in an autoclave reactor as described by way of example in EP0099646. These polymers generally come in the two types referred to in WO00/37543: low VA and high VA.

The use of high EVA limits the contracting force of the film hood. The film tends to be soft, is easily stretched but only exerts a limited force to return to its pre-stretched state. The high EVA is vulnerable to ambient heat and the film holding force may be weakened. These drawbacks can only be partially compensated by the addition of the plastomer. The surface friction provided by the low EVA skin layers, generally having a broader molecular weight distribution, can only controlled imprecisely by high amounts of anti-block, which has a negative effect on the transparency and mechanical properties.

Overall the film of WO00/37543 provides a weak holding force upon contraction after it has been stretched to a considerable degree in stretch hood packaging. The film thickness may have to be increased to obtain a sufficient holding force. Once stretched and contracted around a load, the hood may have a low puncture resistance and, once punctured, a poor tear propagation resistance, which can easily provoke a spill of the palletized load. Full stretching can also lead to wash boarding where different parts of the film stretch differently, giving rise to thicker and thinner film portions. Furthermore, the holding force can weaken when the palletized load is exposed to more elevated temperatures. Adjustment of the coefficient of friction for a particular stretch hood packaging machine or packaging purpose may be unduly limited in range and/or difficult to achieve without detracting from other desired film properties. Many stretchable, elastomeric polymers are inherently sticky. If such a polymer is selected for the surface of stretch hood film, high levels of anti-block may be needed to allow the heat-sealed top of the hood to flatten and fit closely around the palletized load. Such anti-block levels may make the film opaque and interfere with the mechanical and optical properties.

U.S. Pat. No. 6,291,038 described a heat shrinkable film with a medium VA EVA having from 9 to 20 wt % of VA, and a narrow molecular weight distribution and high degree of short chain branching.

As used herein, short chain branching refers to alkyl branches, detectable through 13C NMR techniques and excludes acetoxy branches from the incorporation of vinyl acetate comonomer. Short chain branching as so defined in polymers made in high-pressure free-radical polymerization, results mainly from the Roedel backbiting mechanisms that lead to ethyl and butyl type branches as well as some higher levels of branching. Other short chain branches result from the incorporation along the chain of α-olefins which have generally the effect or the intent of lowering the molecular weight and are referred to as telogens or transfer agents. The use of propylene transfer agent results in methyl-type short chain branches. The use of isobutylene would also result in methyl-type short chain branches. Using NMR techniques the number of carbon atoms in the short chain branch can be determined and also the number of the respective types of short chain branches. Where reference is made 1000 C atoms as the basis for expressing the amount of SCB or LCB, the reference to the 1000 C atoms refers to all carbon atoms, including carbon atoms in acetoxy groups, unless otherwise mentioned.

Atofina markets a grade of low VA content EVA polymer: EVATANE (Registered Trade Mark) 1005VN3, which has a VA content of 3.5 mol % (9.8 wt %) and a Melt Index of 0.33. The film has limited short chain branching and a low relaxation time.

Accordingly, known film structures for stretch hood packaging limit the performance and savings obtainable from stretch-hood packaging systems. The range of applications in which it would perform competitively against stretch film or shrink hood packaging maybe unduly restricted.

It is among the objects of the invention to improve the performance of stretch hood packaging films. In particular it is among the objects to achieve a better balance between stretchability and holding force. It is among the objects to permit a) a reduction in the weight of film needed to provide a given holding force in stretch hood packaging; b) better friction control and a more even stretching of the film for the stretch hood packaging operation and/or c) improved package integrity and transparency, resistance to puncture and tearing, and/or reduced stress relaxation at higher ambient temperatures after the stretch hood packaging operation has been completed.

SUMMARY OF THE INVENTION

The invention has as one aspect a new ethylene based polymer, which may be used to improve stretch film performance. The invention has as another aspect a new film structure and composition which may be used to improve stretch film performance. In the aspect relating to the film structure the new ethylene polymer may be used as a core layer. Alternatively core layers of yet different compositions, such as conventional EVA inter-polymers, may be used in the film structure context. Each of these aspects can contribute to the stretch hood film performance; the aspects are cumulative with the superior performance available from a combination of these aspects.

In one aspect there is provided a polymer comprising units derived from ethylene, said polymer having:

a) a Melt Index of from 0.05 to 20 g/10 min as determined by ASTM-1238 Condition E;
b) at least 10 per 1000 C-atoms of short chain branches, containing five carbon atoms or less, as determined by C13 NMR, and less than 3.5 mol % of units derived from a copolymerizable ethylenically unsaturated ester,
c) a density of from 0.90 to 0.94 g/cm$^3$, preferably 0.91 to 0.935 g/cm$^3$, especially 0.92 to 0.93 g/cm$^3$ as determined by ASTM D1505, and
d) a relaxation time as described herein of at least 10 s.

Most of these parameters are well known in the art. The relaxation time is rheologically derived and reflects the time taken for the polymer chains to relax after deformation in a molten condition. It is influenced by aspects of the polymer structure such as the long chain branching level, molecular weight and molecular weight distribution if the relaxation time is too high the polymer will strain harden prematurely during cold stretching. A higher relaxation time encourages balanced melt orientation of the film during blown film extrusion. In use Transverse Direction (TD) stretching will then permit some stretching in the Machine Direction (MD) without rupture to provide a top to bottom holding force in addition to a sideways holding force.

Preferably the polymer contains at least four, especially five SCB per thousand carbon atoms containing three carbon atoms or less. Preferably the relaxation time is at least 11 and/or less than 20, or less than 15.

The polymer of the invention may conveniently be produced in free-radical polymerization, preferably using a tubular reactor. The ethylene derived units suitably form more than 85 wt % of the polymer. The amount of short chain branches, containing 5 carbon atoms or less, is suitably less than 30, preferably less than 20 per 1000 C-atoms.

The copolymerizable ethylenically unsaturated ester may be absent but preferably the polymer contains from 1 to 3 mol % of units derived from the copolymerizable ethylenically unsaturated ester and/or at least 1 per 1000 C-atoms of long chain branches containing 6 or more carbon atoms as determined by C13 NMR. The ethylenically unsaturated ester may be ethylene methacrylate and its higher acrylate analogues such as ethylene ethyl acrylate but is preferably ethylene vinyl acetate. If the VA content is too high ester the polymer may not contract sufficiently after extension to develop the desired holding force. Suitably also the polymer has a bimodal molecular weight distribution as determined by GPC DR1 and/or the relaxation time is less than 20 s. The bimodality may be apparent as a shoulder in a graph representing the molecular weight distribution.

While the polymer may have a Melt Index of less than 20 g/10 min, preferably less than 15 and especially less than 10 g/10 min, it is preferred for blown film extrusion that the polymer has a Melt Index of from 0.1 to 4 g/10 min; preferably less than 2 g/10 min and especially less than 1 g/10 min.

In another aspect the invention, the polymer is described in terms of the process features used in its manufacture, which result in its unique properties. In this preferred aspect the invention provides a polymer comprising units derived from ethylene obtainable by free radical polymerization using a chain transfer agent that incorporates into the polymer chain, preferably propylene, as a chain transfer agent to provide a polymer having a Melt Index of from 0.05 to 20 g/10 min as determined by ASTM-D 1238 Condition E; and at least 10 per 1000 C-atoms of short chain branches, containing five carbon atoms or less, as determined by C13 NMR and less than 3.5 mol % of units derived from a copolymerizable ethylenically unsaturated ester.

The free radical polymerization may be performed in a stirred autoclave but is preferably produced in a tubular reactor under circumstances to favor LCB formation in a down stream part of the tubular reactor and preferably has a density of from 0.90 to 0.94 g/cm$^3$, more preferably 0.91 to 0.935 g/cm$^3$, especially 0.92 to 0.93 g/cm$^3$ as determined by ASTM D1505, and/or preferably has a relaxation time as described herein of at least 10 s. LCB formation may be favored reduced transfer agent concentration and/or increased temperature in a downstream part of the tubular reactor. The features of the polymer of the invention discussed above in terms of the density, relaxation time, ethylene content, short chain branch levels, molecular weight distribution and Melt Index can equally be applied to this aspect of the invention.

The transfer agent is preferably selected to provide a high propensity to incorporate. Hence propylene is preferred and comprises preferably from 60 to 100% of the total transfer agent content. However smaller amounts of other transfer agents (isobutylene, aldehydes) may be used.

More broadly the process for producing the polymer may be a free radical polymerization process comprising feeding ethylene and a copolymerizable ethylenically unsaturated ester and propylene as a chain transfer agent, under conditions favoring formation of short chain branches by backbiting and propylene incorporation to provide a polymer having a Melt Index of from 0.05 to 20 g/10 min as determined by ASTM-D 1238 Condition E; and optionally less than 3.5 mol % of units derived from the copolymerizable ethylenically unsaturated ester. The conditions of polymerization may be adapted to obtain the optional and preferred polymer features described previously.

Preferably the polymerization is performed in a tubular reactor at from 2200 to 2700 bar and from 180 to 330° C. with multiple injection of feed and initiator but with reduced or no injection of monomer and optionally reduced and/or no or reduced injection of transfer agent at a downstream reaction zone. A final temperature peak at a downstream reaction zone with reduced or no monomer injection may be in excess of the temperature peak of at least two temperature peaks at two reaction zones upstream of the final reaction zone. The final temperature peak at a downstream reaction zone with reduced or no monomer injection may be in excess of the temperature peak of at least one temperature peak at a reaction zone upstream thereof at which monomer is injected.

The polymer of the invention may be used for stretch hood packaging by forming the polymer into a film, which may be a mono-layer or multi-layer structure, capable of TD stretching by at least 100% and ensuring retention of that film around a load by subsequent elastic recovery. The film structure is selected appropriately.

Preferably the film has a main layer with at least 50 wt %, based on the total weight of polymers in the main layer, of a polymer with any one or more of the features described previously, said film having an elastic recovery after a 100% stretch of at least 40% and providing a normalized holding force per 100 μm thickness pre-stretch at 85% stretch, after an initial stretch of 100%, of at least 20 N/50 mm at a deformation rate of less than 10% of the original starting length per second.

In industrial application the behavior and performance of the film when processed at the speeds practised in industry, generally higher than those used in laboratory equipment, is important. A suitable mono-or multi-layer structure can provide such performance also at higher rates of deformation such as those in excess of 12% of the original starting length per second. Such a film can be used to minimize the amount of film material needed to establish a sufficient holding force and also optimize the film behavior during extension and after contraction around a load on a stretch hood packaging line with reduced risk of tearing or puncturing.

The tensile-stress behavior when the film is stretched at ambient temperatures for stretch hood packaging is also of interest. Usually in a graph of the extension or stretch versus the stress applied, the initial slope is steepest. The information can be extracted as the Secant Modulus. Preferably the Secant modulus of the un-stretched film is less than 120 MPa. The Elmendorf tear strength is at least 10 g/μm, preferably at least 12 g/μm and less than 25 g/μm.

Generally speaking the steeper the initial slope, the stiffer the film and the more power will be needed to stretch it initially. After the initial extension, the slope flattens and less force is needed for each further increment of extension of the film. The slope may become negative where a further increment of extension requires less force than a previous increment. Preferably the film can be extended up to 100% while providing a minimum tensile test slope of at least 0.01 MPa per % elongation. This helps to avoid "wash boarding" which undermines the visual appearance and creates highly stretched parts that are prone to puncture and can split the film after it has contracted around a load. The polymer of the invention assists in maintaining minimum tensile test slope of at least 0.01 MPa per % elongation throughout the stretching process.

In the film the polymer of the invention may be used on its own or in a mixture with another polymer. The reasons for adding another polymeric component include helping processability by increased presence of long chain branching or broader molecular weight distribution; or increasing strength in the end film by use of a more crystalline polymer. If necessary the film may comprise a copolymerizable ethylenically unsaturated ester, preferably vinyl acetate, having a content of copolymerizable ethylenically unsaturated ester of from 4 to 10 mol % and/or an ethylene α-olefin interpolymer having a density of from 0.915 to 0.86 and an MI of from 0.5 to 5 to help in achieving the positive tensile slope of at least 0.01 MPa per % elongation up to 100% stretch. Presence of the ethylene α-olefin interpolymer can contribute to snap-back, that is to say the speed of elastic recovery.

Suitably the film has a multi-layer structure (such as a three or five layer structure) with a skin layer arranged to one or both sides of the main layer. The skin layer or layers may comprise a linear low density ethylene copolymer (LLDPE) having a density of from 0.91 to 0.94. The structure is preferably an A/B/C structure where C may be the same as or different from A. At least one skin layer should be an LLDPE. The other skin layer may be a different LLDPE or a non-LLDPE material. The film of the invention may be made by blown film extrusion in tubular form adapted to form a stretch hood capable of transverse direction extension of at least 100% and subsequent elastic recovery.

The film appearance is preserved upon extension and significant immobilizing or holding force can be developed. Depending on the composition of the film, the loss in holding force encountered upon heating of the palletized load can be substantially restricted to less than 40% of that originally when heated to temperatures of up to 45° C., possibly even up 50° C. or 55° C. or 60° C.

In yet another aspect of the invention there is provided a film having a coefficient of friction of from 0.2 to 10, preferably from 0.3 to 0.8, and most preferably from 0.4 to 0.7 for stretch hood packaging comprising:
a) a core polymeric layer; and
b) a skin layer, on each side of the core which may be of the same or different composition, comprising at least 60 wt % of an LLDPE having density of 0.91 to 0.94 g/cm$^3$ as determined by ASTM-D 1238 Condition E and hexane extractables less than 1.5 wt %, preferably less than 1 wt %, especially less than 0.6 wt %, said skin layer containing less than 7500, preferably less than 3000 ppm of anti-block particulates and said film having an elastic recovery after a 100% stretch of at least 40% and providing a normalized holding force per 100 µm thickness pre-stretch at 85% stretch after an initial stretch of 100% of at least 20 N/50 mm. This is normally done at a deformation rate of less than 10% of the starting length per second. The FDA hexane extractable test used here and in the examples was from the version current to 07 Jul. 2003. The test was performed according to 21 CFR 177.1520 (d)(3)(ii)(e) using a film for extraction and weighing the dried film after extraction and drying to measure the weight loss.

The LLDPE can be conveniently prepared by polymerization using a transition metal compound as a catalyst. The polymerization may be gas phase, slurry or solution polymerization for example.

The anti-block particulates project from the surface of the film to reduce the areas of inter-film contact. Its use is generally minimized to maintain film clarity. Preferably the skin layer contains less than 2500 ppm of particulate, more preferably less than 2000. Particle sizes of talc or silica anti-block useful for anti-block in films may vary as is well known in the art. The slip agents are designed to migrate to the surface to provide a lubricating film to reduce the coefficient of friction. The relative amounts of slip-agent and any anti-block are influenced by the basic frictional and cling characteristics of the LLDPE skin. Using the invention, coefficients of friction suitable for stretch hood packaging can be established.

The handling of the film under tension during the stretch hood packaging operation may be improved in this way and be adapted more easily to different requirements. The use of an elastic film, which has to be treated with high levels of anti-block to reduce friction, is avoided. Instead of starting from a low level of anti-block present, the target coefficient of friction can be obtained by the judicious addition of a slip agent. The wash-boarding problem can be mitigated by the use of an LLDPE made using a single site catalyst (e.g. a metallocene) having a tensile test slope of at least 0.01 MPa per % elongation up to 100% extension, for example that made as described in WO98/44011 incorporated by reference herein for US purposes. The top of the stretch hood can be heat sealed to provide a high bond strength.

Having used slip agent to achieve a target coefficient of friction, it can be advantageous to ensure that coefficient is maintained after manufacture of the film and before use in stretch hood packaging. This may be achieved by using an amount of migratable component in the core layer to minimize changes in the coefficient of friction in the skin layer by cross-migration between the layers. By making this film structure using blown film extrusion, the film solidification after extrusion of the bubble is influenced so as to provide improved transparency.

The core layer may be chosen from a wide range of options including high EVA; blends of high EVA with other materials. However superior results may be obtained by using as the core layer of the main layer described with the reference to the polymer of the invention. The film then may undergo major levels of stretching (well over 50%) on a stretching device of the stretch hood packaging machine in the course of the application of the stretch hood to the palletized load. The resistance to stretching by friction against a gripper surface of the stretch hood packaging machine then has to be controlled carefully, particularly when thin films are used which become even thinner in the course of stretching. Thus this aspect of the invention, for giving medium to low friction skin layers, may be usefully combined with the other aspect of the invention, which provides a polymer and films with a high level of SCB and a high relaxation time that can be highly stretched.

Satisfactory results are obtained where the skin layers constitute jointly from 10 to 60% of the overall film thickness, preferably from 30 to 50%. The film thickness can vary within plus or minus 5% of the average, yet wash boarding can be minimized. Advantageously the average thickness of the film pre-stretch varies from 25 to 300 µm. Advantageously the overall average film thickness may be from 25 to 75 µm while still providing satisfactory stretch hood packaging performance. The film can be formulated overall to provide a minimum tensile test slope of at least 0.01 MPa; a Secant modulus before stretching of less than 120 MPa and/or an Elmendorf tear strength of at least 10 g/µm. The film structure is selected appropriately.

The high puncture and tear resistance can permit the production of films that are perforated to facilitate fluid permeability of the stretch hood package, for example to permit continued drying etc. The multi-layer film may be made by blown film extrusion in tubular form adapted to form a stretch hood capable of transverse direction extension of at least 100% and subsequent elastic recovery.

The skin and core may also be modified by the use of additives. The core and/or skin may be modified by the incorporation of a PPA processing additives or a slip additive, including PP or HDPE as a polymeric anti-block additive.

Using various aspects of the invention, alone or in combination, stretch hood systems can be optimized to minimize the amount of film needed, the energy consumption for shrinking and/or applying the film and stickiness in the film necessary for adhesion. The films can be applied and the packaged good stored in a wide range of temperature conditions. In production by blown extrusion, good bubble stability can be achieved and the resulting film can have a high transparency due to the low amount of particulate anti-block.

DETAILS OF THE INVENTION

The ethylenically unsaturated ester may be vinyl acetate, methyl acrylate, butyl acrylate and ethyl acrylate or a combination. The transfer agent used in the production of the polymer of the invention can incorporate into the chain and this assists in creating the short chain branches of the polymer. Preferably the transfer agent is propylene, although higher olefins such as iso-butylene or butene-1 may be used. NMR techniques struggle to differentiate branches having six or more carbon atoms and these are referred to collectively as Long Chain Branches (LCB). The presence of LCB in whatever amount or structure is reflected in the relaxation time. The molecular weight distribution Mw/Mn by DRI is preferably at least 8 and preferably bimodal, under which circumstances a high load/low load MI ratio is less suited to reflect the influence of LCB.

The LLDPE for the skin layer of the film of the invention may be made by gas phase polymerization processes such as those described in WO9425495 incorporated by reference for US purposes. The preferred material is an LLDPE with some long chain branching which may be made by the process described in WO98/44011 incorporated by reference for US purposes. The molecular weight distribution expressed as a Mw/Mn value, as measured by DRI GPC, for the LLDPE may vary from 2.0 to 3, preferably at least 2.5, especially at least 4, to 8, especially less than 7. Overall orientation upon extrusion may be limited by selection of low Mw/Mn such as from 2.3 to 3.5. This permits the orientation of the core layer to dominate the film stretch properties. Some Long Chain Branching may assist in establishing transverse orientation helpful against wash boarding. Short chain branching may be provided by alpha-olefin comonomers having from 3 to 10 C-atoms, such as butene-1, hexen-1 and octene-1. The Melt Index Ratio expressed in $I_{21.6}/I_{2.16}$ may vary from 10, preferably more than 30, to 100, especially less than 80. While the disclosures rely on metallocene single site supported catalysts, other transition metal components may serve as single site catalysts and provide appropriate polymer homogeneity and absence of low molecular weight extractables. In addition conventional titanium based Ziegler Natta catalyst systems may be optimized to reduce the production of low molecular weight extractables. Such polymers can be equally suitable for the films of the invention.

The skin layer in the multi-layer film structures of the invention may contain, in admixture with the LLDPE, small amounts, generally less than 20 wt % of a high pressure low density polyethylene; a linear high density polyethylene or polypropylene or a combination thereof. The core layer may contain small amounts, generally less than 40 wt % of a linear very low density polyethylene having a density of from 0.86 to 0.90, an LLDPE having a density of from 0.91 to 0.94; and/or an elastomer with ethylene or propylene derived crystallinity. Layers may be interposed between the core and skin layers, part of the purpose may be to limit the amount of the more expensive polymers for the skin and core layers.

The amount of slip agent employed, especially that in the skin layers, is preferably limited to max 500 ppm. If there is too much slip agent employed, then the coefficient of friction will become too low, with resultant poor film handling in the packaging machine. More preferably an amount of slip agent of 150 to 300 ppm is used. Examples of slip agent that may be used are primary or secondary amides, such as erucamide and oleamide. In addition to or instead of slip agent, an anti-agglomeration additive may be used, for example stearates. If employed, such additives would normally be used in greater amounts than required for the slip agent, e.g. from 1000 to 5000 ppm.

The film preferably does not contain any tackifying agents such as PIB or castor oil or similar additive. The presence of such tackifying additives will generally have an adverse effect on control of coefficient of friction. It is believed, without being bound by theory, that the core and skin layers each make distinct contributions to the overall film properties. When the polymer composition of the skin and core layers are blended into a single layer, the effects differ from when they are used in distinct layers. Each layer makes its own contribution. By suitable combination of skin and core layers, a film can be made which permits considerable stretching while retaining its physical integrity and tear resistance, while at the same time the core layer remains able to provide a optimized contracting force.

EXAMPLES

The invention is explained by reference to the Examples in which mention is made of the following Figures:

FIG. 4 shows a graph plotting shear rate and viscosity for calculation of the relaxation time of the EVA copolymer according to the invention referred to in the Examples;

FIG. 5 shows a bar chart indicating stretch hood relaxation and retained force at elevated temperatures (75% initial stretch-60% final stretch) of a film of the invention made using the EVA copolymer referred to in the Examples;

FIGS. 6A and 6B show graphs illustrating tear propagation behavior of different films including a film according to the invention.

POLYMER COMPONENTS

In general the EVA copolymer is produced in a tubular polymerization reactor by free radical initiation. Initiators used may be oxygen, peroxides and similar agents. The chain transfer agent, instrumental in increasing the amount of short chain branching is an alpha-olefin, generally consisting substantially of propylene. The highly exothermic reaction is performed in a reactor operating under high pressure (2000 to 3200 bar), under turbulent flow and at high temperatures (150 to 330° C.). The heat of polymerization is removed through the tube wall. Operating conditions like reactor pressure, reactor temperature in the different reaction zones and co-monomer and chain transfer agent concentrations are adjusted to achieve the required product properties. The effect of operating conditions on product properties, is discussed in (Ehrlich and Pittilo [1], Ehrlich and Mortimer [2], Luft [3], Marano and Jenkins [4], Yamamoto and Sugimoto [5], Goto et al. [6], Luft et al. [7, 8], Ogo [9], Beasly [10].)

REFERENCES

[1] P. Ehrlich and R. N. Pitillo, J. Polym. Sci., 43, 389 (1960).
[2] P. Ehrlich and G. A. Mortimer, Adv. Polym. Sci., 7(3), 386 (1970).
[3] G. Luft in "Polymer Handbook". (Eds. J. Brandrup and E. H. Immergut), Wiley, New York (1975).
[4] J. P. Marano Jr. and J. M. Jenkins, in "High Pressure Technology" (edited by I. L. Spain and J. Paauwe) 61 (1977).
[5] K. Yamamoto and M. Sugimoto, J. Macrom. Sci.-Chem., A13(8), 1067 (1979).
[6] S. Goto, K. Yamamoto, S. Furui and M. Sugimoto. J. Appl. Polym. Sci.: Appl. Polym. Symp., 36, 21 (1981).
[7] G. Luft, P. Lim and M. Yakawa, Makromol. Chem., 184, 207 (1983a).
[8] G. Luft, P. Lim and M. Yakawa, Makromol. Chem., 184, 849 (1983b).
[9] Y. Ogo, JMS-Rev. Macrom. Chem. Phys., C24(1), 1 (1984).
[10] J. K. Beasly in "Comprehensive Polymer Science", 3, 273 (1989).

Figure 1:
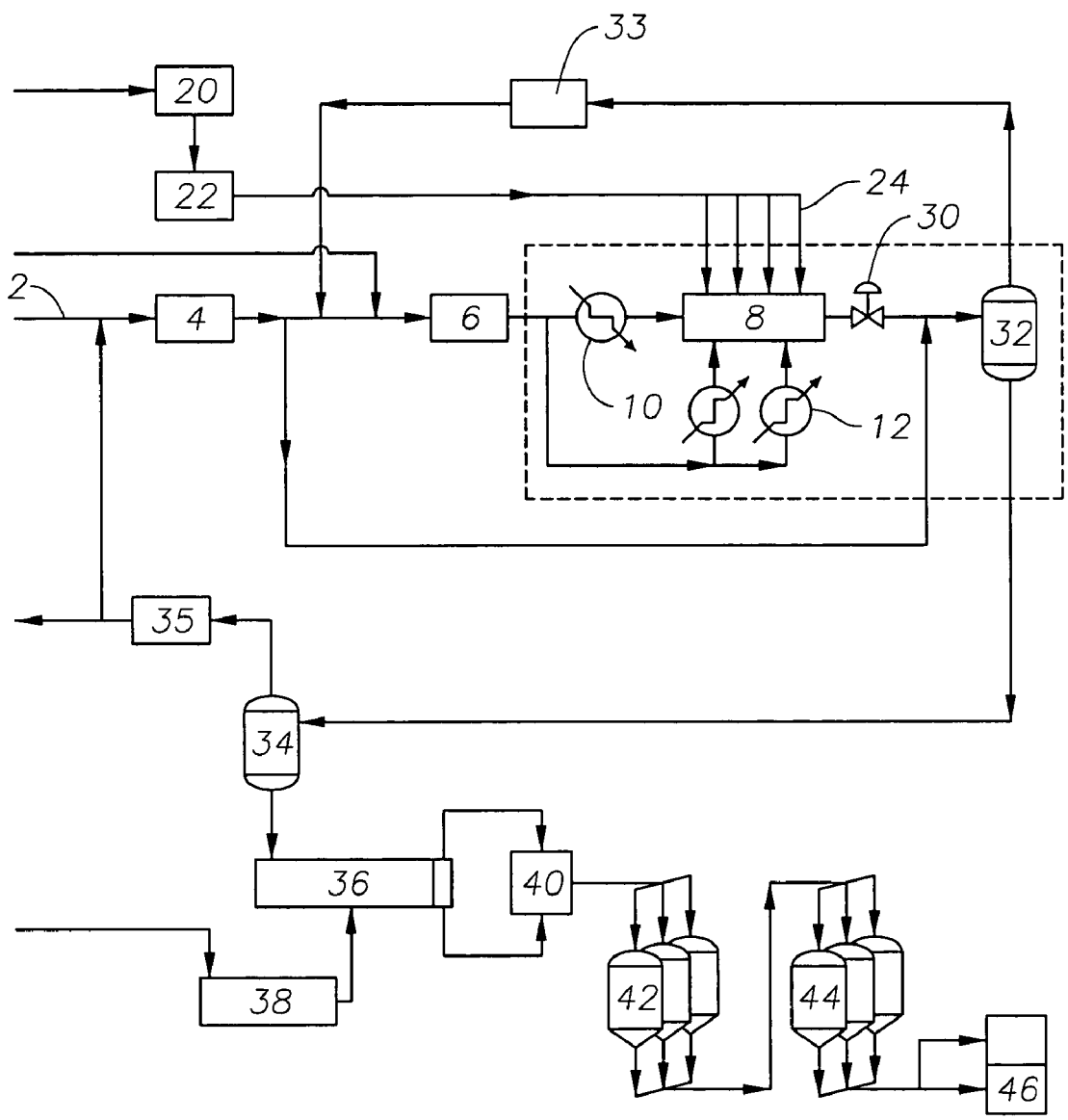
FIG. 1 is a schematic layout of a tubular reactor plant used to make the EVA polymer according to the invention referred to in the Examples.
Figure 2:
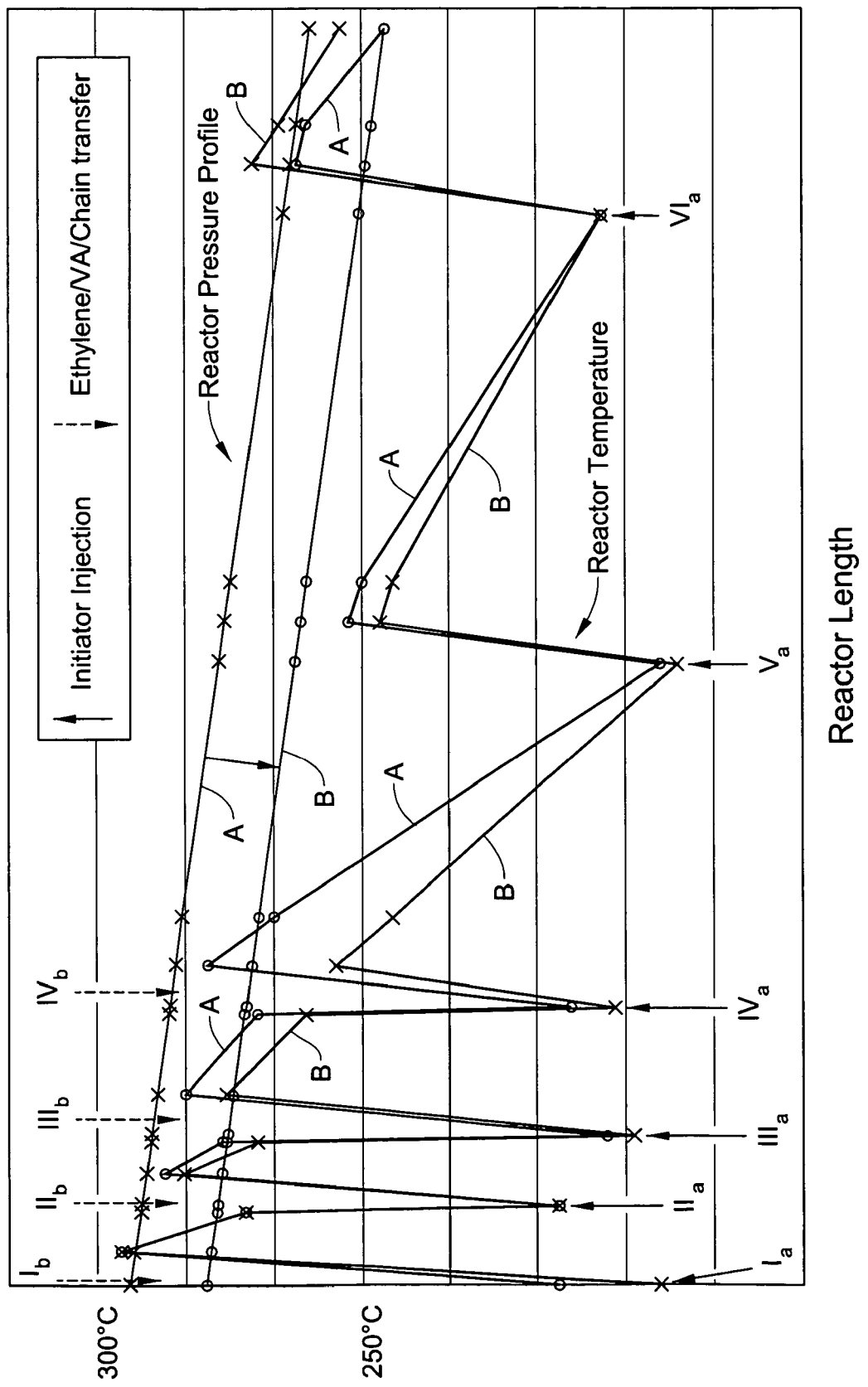
FIG. 2 is a temperature profile used to run the reactor of FIG. 1 so as to provide the EVA copolymer according to the invention referred to in the Examples.

With reference to FIGS. 1 and 2 in a tubular reactor, a monomer feed of ethylene, vinyl acetate and transfer agent via line 2 is supplied to a primary compressor 4 and hence to a secondary compressor 6. The discharge flow of the secondary compressor 6 is divided in the number of streams required for the front and side streams of the tubular reactor 8 as indicated by arrows Ib to IVb in FIG. 2. The flow to the front (upstream end) of the reactor 8 is heated at 10 while the flows to the side stream entry points are cooled at 12. The side stream flows are then fed to injection points along the length of the tubular reactor 8.

The tubular reactor 8 is a plug flow reactor with limited back-mixing. Peroxide type initiator is supplied from storage at 20, mixed with solvent and supplied by pump 22 to the reactor 8 at position indicated in FIG. 2 at Ia to VIa. Multiple peroxide injection points 24 are used along the length of the reactor 8 to maximize conversion of ethylene to EVA polymer and optimize product properties. Four or more injection points are used. It is to be noted that the final injection point or points is in a tube section where the monomer feed is not supplied. Reactor conversion rates can approach 40%.

The peroxide initiator initiates the free radical, exothermic polymerization reaction. The reaction heat is removed by an increase of the temperature of the ethylene, by injection of the cold side stream of ethylene and by heat transfer through the reactor wall to a closed-loop jacket water cooling system. It is to be noted that in comparison with the usual temperature fluctuation as shown by line A, the temperature fluctuates as shown by line B (see FIG. 2). The temperature initially is lower than usual. The temperature at the downstream portion, where no monomer feed is supplied by a side-stream, is allowed to become higher than usual. The conversion of ethylene to polymer is maximized by the use of reactor jacket water at suitable cooling water temperatures. This cool jacket water maximizes the heat transfer through the thick walled reactor pipes. The pressure drop along the length of the reactor is minimized through the use of a stepped profile on reactor tube diameters. Line A indicates the usual pressure-drop along the reactor length for conventional EVA production; line B is indicative of the absolute pressure employed for the EVA of the invention. This stepped profile optimizes the gas velocity along the length of the reactor, which virtually eliminates fouling on the interior wall of the tubular reactor.

An extensive distributed computer control system is used to control the reactor temperature profile and other key process variables.

After polymerization (which takes about 20 to 40 seconds in tube with a length of 1.8 km and a diameter of approximately 32.65 mm), the reaction fluid is decompressed through the reactor pressure control valve 30 to about 300 barg and cooled with the low pressure cold quench from the primary compressor discharge. The mixture is then fed to the high pressure separator 32 where polymer is separated from unreacted monomer. The use of the low pressure quench minimizes the formation of gels and improves the clarity. Recycled monomer is recycled as at 33 to the secondary compressor 6.

The molten polymer and a small amount of entrained ethylene are again decompressed to approx. 0.7 barg through a low pressure let-down valve and fed to the low pressure separator 34. At this point most of the remaining entrained monomer is separated from the EVA and is sent to the purge gas compression system 35.

The purge gas compressor 35 boosts the low pressure separator off-gas to the suction pressure of the primary compressor 4 (operated at ethylene pipeline pressure). At this point, part of the gas is purged from the EVA line to the monomer recovery system, while the majority of this gas is recycled via the primary compressor back to the reactor system.

The polymer melt from the low pressure separator 34 is fed to the hot melt extruder 36. In the hot melt extruder additives are mixed in. This is typically done via a sidearm extruder 38 utilizing the masterbatch technique. Note that the masterbatch can contain additives such as slip, antiblock and antioxidant. Alternatively, liquid additive injection can be considered.

The polymer strands leaving the die of the extruder are cut into pellets underwater, and the pellets are cooled, dried at 40 and pneumatically transferred to weigh-bins 42 or blenders 44, in which the pellets are purged to reduce the residual ethylene concentration to a safe to store concentration (<50 wppm). After blending the pellets are conveyed to bulk loading or bagging facilities 46.

To make the particular EVA's of the invention and those used in the Examples, process conditions are adjusted to achieve a broad molecular weight distribution with the appropriate amount of branching on the polymer while keeping the melt index sufficiently low. The conversion is targeted to be high by using four or more injection points for the initiator and injecting ethylene monomer with modifier or transfer agent diluted in the monomer, upstream of the final initiator injection point, at one or more locations. The depletion of the modifier permits extensive branching in the final polymerization stages. This process can be operated to give the desired low MI and broad molecular weight distribution. Reactor pressures are towards the low end of the range conventionally used (2200 to 2700 bar) while the reactor temperatures lowers progressively along the length of the tube. The average temperature is increased to above 220° C., towards 300° C. at the upper end of the conventional range (180 to 330° C.), so as to favor formation of short chain branches and maximize the long chain branching. The temperature is increased downstream of the final injection point in comparison with conventional operating conditions to increase long chain branching further. Propylene is used as the olefinic chain transfer agent to increase the short chain branching of the polymer backbone further. The actual concentration at VA and propylene in the respective streams can be varied to yield and molecular weight. The EVA's used in these Examples had the following characteristics:

TABLE 1

| Characteristic | Measured by | Inventive EVA | EVA[1] UL00109 | EVA[1] UL00018 | EVATANE[2] 1005VN3 |
|---|---|---|---|---|---|
| Melt Index (MI) g/10 min | ASTM-D 1238 Condition E | 0.41 | 0.49 | 0.35 | 0.33 |
| Melt Index Ratio $I_{21}/I_2$ | ASTM D1238 D | 79 | 80 | 86 | 105 |
| VA mol % | NMR 16-1.2 L | 2.3 | 3.2 | 6.9 | 3.5 |
| Density (g/cm$^3$) | ASTM-D 1505 | 0.9275 | 0.9324 | N/A | N/A |
| Heat of Fusion | ASTM-D 3417-3418 | 95.5 J/g | 112.5 J/g | 69.5 J/g | 96.9 J/g |
| Peak Melt Temp. | ASTM-D 3417-3418 | 98° C. | 100.5° C. | 85° C. | 97° C. |
| SCB per 1000 C with five carbon atoms or less | NMR 04-1.1 | 14.3 | 7.13 | 6.6 | 10.4 |
| SCB per 1000 C with three carbon atoms or less | NMR 04-1.1 | 6.29 | 2.66 | 2.40 | 3.28 |
| Relaxation time 230° C. (s) | WO97/45244 page 5 lines 1 to 19. | 11.7 | 6.9 | 15.5 | 8.8 |
| Mw/Mn | GPC 03-2.1 | 9.2 | 5.1 | 4.4 | 5.1 |

[1]Escorene Ultra (Trademark of ExxonMobil)
[2]Trademark of Atofina.

The VA mol % is calculated using the CH resonances between 75 and 68 ppm and the resonances between 50 and 0 ppm including the $CH_2$, $CH_3$ from VA and the $CH_2$, CH and $CH_3$ from Ethyl moieties. The correlation with wt % of VA is that 1 mol % VA equals 2.7 wt % VA.

Figure 3A:
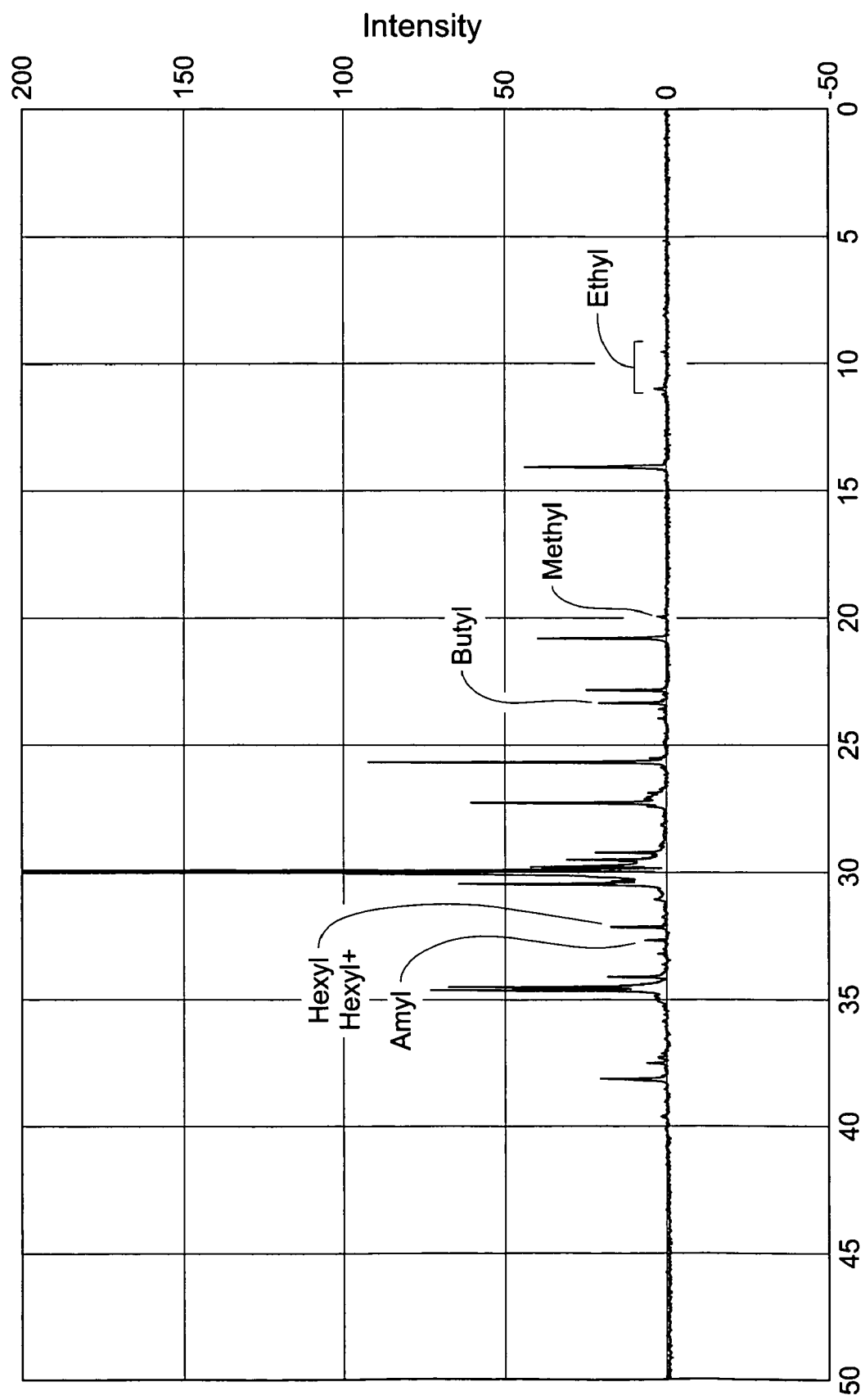
FIGS. 3A and 3B show a 13C NMR plots of the EVA copolymer according to the invention and a comparative grade UL00109 referred to in the Examples.
Figure 3B:
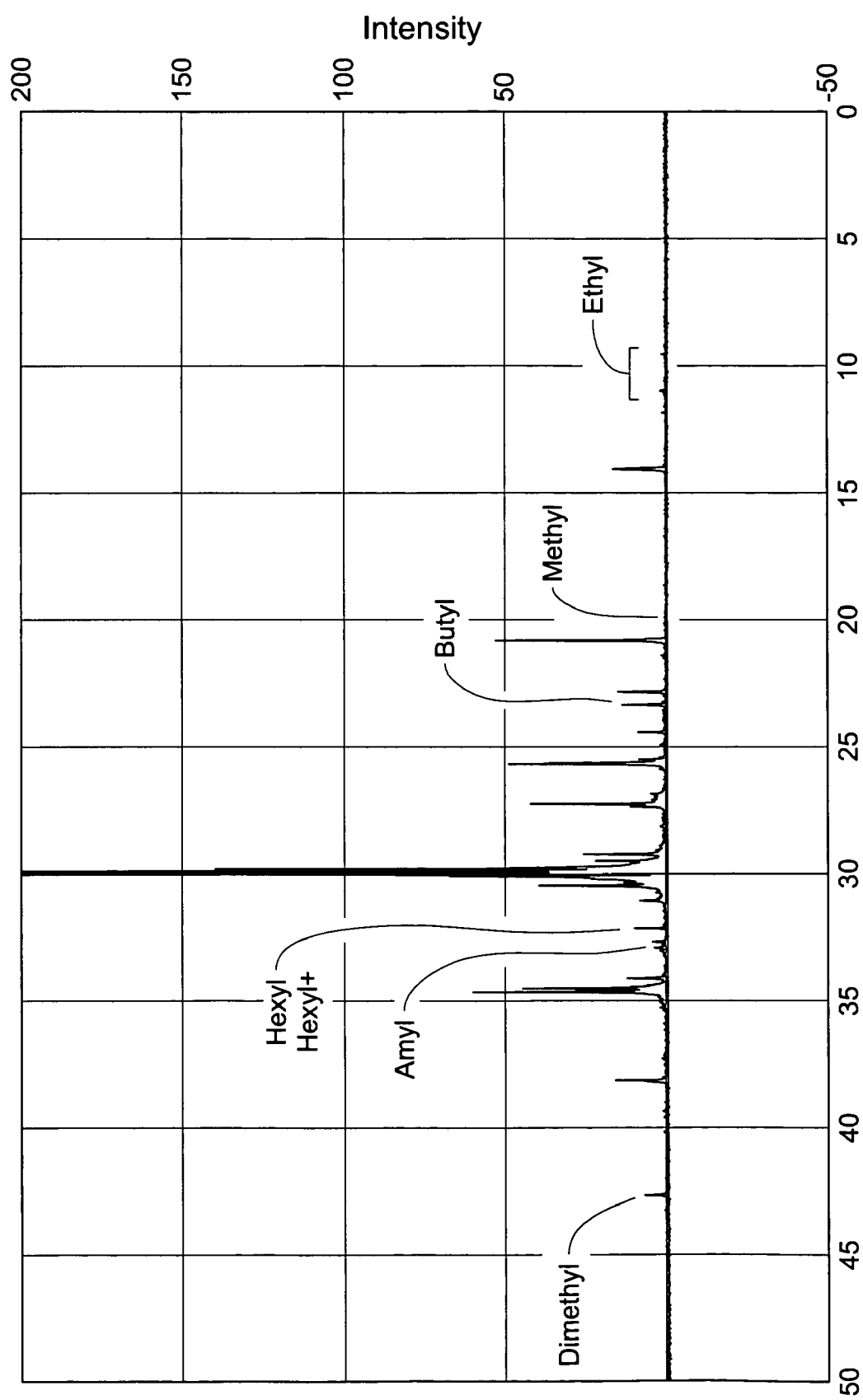

SCB is determined by reference to the content of alkyl type SCB with five carbon atoms or less as illustrated below. FIG. 3A shows a 13C NMR plot of the EVA copolymer according to the invention referred to in the Examples and provides the data for Table 2: FIG. 3B gives the same plot of a known EVA for comparison.

TABLE 2

| Configuration measured | Peak location in ppm[4] | Inventive EVA[3] | EVA[1] UL00109 | EVA[1] UL00018 | EVATANE[2] 1005VN3 |
|---|---|---|---|---|---|
| Methyl[2] | 19.948. | 1.19 | 0.00 | 0.00 | 0.00 |
| Ethyl | 9.539 + 10.996 | 5.1022 | 2.66 | 2.40 | 3.28 |
| Dimethyl | 42.7 | 0 | 0.87 | 0.06 | 0 |
| Butyl | 23.359 | 6.08 | 3.34 | 2.89 | 5.42 |
| Amyl | 32.679. | 2.12 | 1.13 | 1.31 | 1.93 |
| Total SCB with five carbon atoms or less | | 14.3 | 8.00 | 6.66 | 10.38 |
| Hexyl + LCB with six carbon atoms or more[1] | 32.165 | 3.55 | 1.77 | 2.04 | 2.34 |
| 2-ethyl hexyl | 24 | 1.51 | 0.79 | 1.13 | 0.97 |
| 2-ethyl-heptyl | 23.6 | 1.58 | 0.89 | 1.12 | 1.41 |
| VA carbonyl | 169 ppm. | | | | |
| VA $CH_2O$ | 74 ppm. | | | | |

[1]Excluding 2-ethyl hexyl and 2-ethyl-heptyl.

[2]The methyl groups on vinyl acetate derived monomer acetoxy units, whether in the main chain or whether in a side chain, are excluded from the SCB determination.

[3]Intensity in number of groups per 1000 carbon atoms.

[4]ppm = parts per million.

The relaxation time was determined from the following data plotted in FIG. 4 from determinations of shear rate and viscosity of the EVA copolymer according to the invention referred to in the Examples.

TABLE 3

Temp: 230° C.

| Shear rate ($s^{-1}$) | Measured | | Predicted | |
|---|---|---|---|---|
| | Viscosity (Pa * s) | Shear stress (Pa) | Viscosity (Pa * s) | Shear stress (Pa) |
| 3.41E+02 | 1.88E+02 | 64158 | 284 | 96792 |
| 2.32E+02 | 2.64E+02 | 61190 | 346 | 80359 |
| 1.58E+02 | 3.44E+02 | 54467 | 422 | 66673 |
| 1.08E+02 | 4.40E+02 | 47373 | 513 | 55277 |
| 7.34E+01 | 5.55E+02 | 40726 | 624 | 45786 |
| 5.00E+01 | 6.95E+02 | 34763 | 758 | 37883 |
| 3.41E+01 | 8.65E+02 | 29479 | 919 | 31302 |
| 2.32E+01 | 1.07E+03 | 24846 | 1113 | 25821 |
| 1.58E+01 | 1.32E+03 | 20815 | 1345 | 21259 |
| 1.08E+01 | 1.61E+03 | 17339 | 1621 | 17463 |
| 7.34E+00 | 1.96E+03 | 14351 | 1949 | 14305 |
| 2.32E+00 | 3.37E+03 | 7820 | 3314 | 7692 |
| 1.58E+00 | 3.98E+03 | 6298 | 3919 | 6196 |
| 1.08E+00 | 4.68E+03 | 5038 | 4606 | 4962 |
| 7.34E−01 | 5.44E+03 | 3996 | 5378 | 3947 |
| 5.00E−01 | 6.29E+03 | 3143 | 6233 | 3117 |
| 3.41E−01 | 7.19E+03 | 2450 | 7165 | 2441 |
| 2.32E−01 | 8.16E+03 | 1894 | 8163 | 1895 |
| 1.58E−01 | 9.19E+03 | 1452 | 9214 | 1457 |
| 1.08E−01 | 1.02E+04 | 1103 | 10298 | 1109 |
| 7.34E−02 | 1.13E+04 | 830 | 11396 | 836 |
| 5.00E−02 | 1.24E+04 | 620 | 12485 | 624 |
| 3.41E−02 | 1.35E+04 | 459 | 13544 | 461 |
| 2.32E−02 | 1.47E+04 | 342 | 14554 | 338 |

The predicted data is from the Cross model in which:

Shear Stress=(Zero shear viscosity*shear rate)/(1+ relaxation time, $\lambda$*shear rate) ^ powerlaw index, m.

The loss function for best fit, measured versus the predicted, is defined as the sum of the differences in squares; SUMXMY2 where the x and y array is measured and predicted viscosity respectively. The solver tool in Microsoft Excel Windows 2000 version is issued to perform the curve fitting. The relaxation time is derived from the Cross model parameters that will results in the minimum sum of the square differences. The Cross parameters provided by the curve fitting are set out in Table 4:

TABLE 4

| Zero shear | Lambda (s) | M |
|---|---|---|
| A | B | C |
| 21910 | 11.68 | 0.523 |

Lambda is the relaxation time. M represents the power low index. The Zero shear is indicative of the plateau viscosity. M is indicative of the slope of the shear curve in the high shear rate region.

The GPC procedure used in this and the later Tables is as follows. Mw and Mn were measured by GPC (Gel Permeation Chromatography) on a Waters 150 gel permeation chromatograph equipped with a differential refractive index (DRI) detector and Chromatix KMX-6 on line light scattering photometer. The system was used at 135° C. with 1,2,4-trichlorobenzene as the mobile phase. Shodex (Showa Denko America, Inc) polystyrene gel columns 802, 803, 804 and 805 were used. This technique is discussed in "Liquid Chromatography of Polymers and Related Materials III", J. Cazes, editor, Marcel Dekker. 1981, p. 207, which is incorporated herein by reference. No corrections for column spreading were employed; however, data on generally accepted standards, e.g. National Bureau of Standards Polyethylene 1484 and anionically produced hydrogenated polyisoprenes (an alternating ethylene-propylene copolymer) demonstrated that such corrections on Mw/Mn (=MWD) were less than 0.05 units. Mw/Mn was calculated from elution times. The numerical analyses were performed using the commercially available Beckman/CIS customised LALLS software in conjunction with the standard Gel Permeation package.

The plastomer was made by the process generally described in WO00/24793 incorporated by reference for US purposes and is sold commercially by ExxonMobil Chemical Company as EXACT 0201. It had the following characteristics:

TABLE 5

| Characteristic | Measured by | Value |
|---|---|---|
| Melt Index (MI) g/10 min | ASTM-D 1238 Condition E | 1.1 |
| Melt Index Ratio | ASTM-D 1238 $I_{21}/I_2$ | 33 |
| 1-Octene mol % | NMR 04-1.1 | 5.15 |
| Density(g/cm$^3$) | ASTM-D 1505 | 0.902 |
| Heat of Fusion | ASTM-D 3417-3418 | 86 J/g |
| Peak Melt Temp | ASTM-D 3417-3418 | 94° C. |
| Mw/Mn | GPC 03-21 | 2.8 |

The EXACT grades are available with HS additivation including slip and anti-block and without such additives in which there is no suffix. The polymer used for the skin layers is made by the process generally described in WO94/25495 and sold commercially by ExxonMobil Chemical Company as EXCEED 1018 CA without anti-block and EXCEED 1018 EB with anti-block. These grades contain anti-oxidants and PPA (a fluoropolymer based material supplied under the Trade Mark Dynamar by Dyneon) in the usual amounts. Exceed 1018 CA contains no slip and no anti-block. Exceed 1018 EB contains 750 ppm of erucamide and 1500 ppm. talc as anti-block and has an extractability according to FDA177.1520d3ii as set out herein of 0.3-0.4 wt %.

These EB and CA grades have the following shared characteristics:

TABLE 6

| Characteristic | Measured by | Value |
|---|---|---|
| Melt Index (MI) g/10 min | ASTM-D 1238 Condition E | 1 |
| Melt Index Ratio | ASTM D1505 | 17 |
| 1-Hexene mol % | NMR 04-1.1 | 2.8 |
| Density(g/cm$^3$) | ASTM D1505 | 0.918 |
| Heat of Fusion | ASTM-D 3417-3418 | 127.5 J/g |
| Mw/Mn | GPC 0.3-2.1 | 2.16 |
| Peak Melt Temp. | ASTM-D 3417-3418 | 118° C. |

In some embodiments a different type of LLDPE may be used, prepared as described WO9844011. This LLDPE has, it is assumed, some long chain branch formation, and the following properties:

TABLE 7

| Characteristic | Measured by | Value |
|---|---|---|
| Melt Index (MI) g/10 min | ASTM-D 1238 Condition E | 1 |
| Melt Index Ratio | ASTM-D 1238 | 40 |
| 1-Hexene mol % | NMR 04-1.1 | 2-3 mol % approximately |
| Density(g/cm$^3$) | ASTM D1505 | 0.92 |
| Heat of Fusion | ASTM-D 3417-3418 | 140.5 |
| Mw/Mn | GPC 03-2.1 | 3 |
| Peak Melt Temp. | ASTM-D 3417-3418 | 117° C. |

Blending and Coextrusion

The EVA's and EXACT plastomer were blended in the blown film extruder from the polymers supplied in pelletized form. The materials were coextruded in a Windmoeller & Holscher coextrusion blown film line as follows for Examples 1, 2 and 3:

TABLE 8

| Coextrusion component | Skin layer A outside of tube | Core layer B | Skin layer C inside of tube |
|---|---|---|---|
| Screw Diameter | 60 mm | 90 mm | 60 mm |
| L/D ratio | 30 | 30 | 30 |
| Feed section bore surface | Smooth | Grooved | Grooved |
| Die diameter 250 mm; die gap 1.4 mm IBC; Contact winder Optifil P2K | | | |

For Examples 4, 5 and 6 the conditions were as follows:

TABLE 9

| Coextrusion component | Skin layer A outside of tube | Core layer B | Skin layer C inside of tube |
|---|---|---|---|
| Screw Diameter | 60 mm | 90 mm | 60 mm |
| L/D ratio | 30 | 30 | 30 |
| Feed section bore surface | Grooved | Grooved | Grooved |
| Die diameter 280 mm; die gap HQ 1.4 mm (in range 0.8-2.2) IBC; Optifil P2, 200° C. (in range 180-240° C.), Output 200 kg/hr. Contact winder | | | |

The resulting structures are as follows:

TABLE 10

| Example | | 1 | 2 | 3 | 4 | 5 | 6 | 7 | Range |
|---|---|---|---|---|---|---|---|---|---|
| Core Layer B | wt % EVA | 100[1] | 85[1] | 70[1] | 70[2] | 70[3] | 70[3] | 100[3] | 50-100 |
| | EXACT[4] | 0 | 15 | 30 | 30 HS | 30 HS | 30 HS | 0 | 0-50 |
| Slip agent | Erucamide | 150 ppm | 150 ppm | 150 ppm | 0 ppm | 0 ppm | 0 | 0 | 0-450 ppm. |
| Skin Layer A/C | CA + EB wt %[5] | 62.5 + 37.5 | 62.5 + 37.5 | 62.5 + 37.5 | 0 + 100 | 0 + 100 | 0 + 100 | 100 + 0 | 0-100 |
| | Talc ppm | 2500 | 0 | 2500 | 0 | 0 | 0 | 0 | 0-10000 |
| Film | Thickness | 140 | 140 | 140 | 150 | 150 | 80 | 80 | 50-200 |
| | A/B/C ratio | 1/3/1 | 1/3/1 | 1/3/1 | 1/3/1 | 1/3/1 | 1/3/1 | 1/3/1 | 1/1/1-1/8/1 |
| Extrusion | Blow up ratio | 3.18 | 3.18 | 3.18 | 2.85 | 2.85 | 2.85 | 2.85 | 2-5 |
| | Frostline height | 750 | 750 | 750 | 740 | 885 | 885 | 885 | |

[1])Inventive EVA from Table 1.
[2])Escorene UL00109 - see Table 1.
[3])Escorene UL00018 - see Table 1.
[4]) EXACT 0201 - see Table 5.
[5])EXCEED 1018 - see Table 6.

The film was used on a stretch hood packaging machine Multiflex supplied by Lachenmeier (Denmark) to immobilize stacks of paper.

11

| | | Value |
|---|---|---|
| Transverse direction stretch | Stretch applied by m/c | 106% |
| | Stretch contracted on pallet | 90% |
| Machine direction stretch | Estimated | 25% approx. |
| Top sealing conditions | Impulse sealing | 50 Hz 0.9-1.1 sec. |

The film subsequent to contraction had the following properties. References 4 to 7 are comparative. Reference 1 is a commercially available film for stretch hood packaging which is a coextruded structure combining high EVA on the inside and low EVA on the surface. Reference 2 is a commercially available mono-layer film from a blend of high and low EVA.

TABLE 12

| Example | 1 | 2 | 3 | 4 | 5 | 6 | 7 | Ref 1 | Ref 2 |
|---|---|---|---|---|---|---|---|---|---|
| Thickness | 144 | 143 | 143 | 150 | 150 | 80 | 80 | 153 | 152 |
| Holding Force N/50 mm | 35.3 | 35.0 | 34.6 | 38.0 | 34.0 | 17.8 | 15.4 | 26.6 | 31.3 |
| Normalized Holding Force 100 μm N/50 mm | 24.7 | 24.5 | 24.3 | 24.0 | 22.0 | 22.2 | 19.5 | 17.4 | 20.6 |
| Elastic Recovery % | 50 | 51 | 51 | 51 | 53 | 51 | 53 | 56 | 48 |
| Tensile TD (MPa) ASTM D 882 | 36.4 | 37 | 37.6 | 36.8 | 41.3 | 46.1 | 41.7 | 28.4 | 26.1 |
| Secant Mod TD (MPa) ASTM D 882 | 153 | 149 | 147 | 145 | 128 | 119 | 106 | 116 | 126 |
| Elmendorf MD (g/μm) ASTM D1922 | 12.4 | 12.1 | 13.5 | 15.3 | 15.3 | 12.5 | 11.3 | 8.4 | 9.2 |
| Elmendorf TD (g/μm) ASTM D1922 | 16.9 | 15.6 | 15.8 | 17.3 | 17.5 | 18.0 | 14.1 | 10.9 | 11.1 |
| Puncture Force N/15 mm | 2.02 | 2.14 | 2.11 | 2.9 | 2.4 | 2.0 | 2.7 | 0.96 | 0.83 |
| Tear Propagation at 100% stretch | OK | OK | OK | OK | OK | OK | OK | Bad | Bad |

The test protocols for measurement of the above film properties, other than the established ASTM methods indicated, are:

a) Holding Force/Elastic Recovery are determined by a method based on an ASTM D5459 standard test method for elastic recovery, permanent deformation and stress retention of stretch film but modified in that the film sample is stretched to a certain elongation (100%) at a certain cross-head speed (1000 mm/min). When the 100% elongation is reached, the cross-head is kept in this position for 5 sec and then reversed to a certain 85% elongation. The load on the sample is then measured after a 60 sec waiting time in (N/50 mm) and recorded as the holding force in the Table. This mimics the holding force acting on the palletized load. Subsequently the cross-head is returned to a position where the force reads zero. The elongation is recorded as the elastic recovery in the Table. The normalized holding force is calculated by adjusting the holding force according to the thickness of the film to a thickness of 100 μm N/50 mm (e.g. the measured value is doubled for a film with an initial thickness of 50 μm).

b) The Tear Propagation is measured based on ASTM 882 but modified in that a film sample (50*50 mm) with a small pre-cut (2 mm wide in MD) is stretched in TD to 100% elongation at 1000 mm/min cross head speed. To pass the test the film should not tear uncontrolled but show an intermittent tear propagation behavior, where the tearing is arrested and further force application is required to restart it.

c) The puncture force is measured to determine the low speed puncture properties of plastic film samples. The method aims to provide load versus deformation response under multi-axial deformation conditions at a fixed relatively low test speed (500 mm/min) to mimic the conditions under which the stretch hood immobilizes a palletized load with sharp articles. In this test a piston with a standard probe fixed to a load cell is pushed through a film sample in a circular sample holder with a 90 mm diameter until the film punctures and breaks. The load is measured on the load cell and the deformation is measured by the travel of the cross-head.

To further illustrate the benefits provided by the Examples, reference is made to the drawings and following discussion with reference to the drawings.

FIG. 4 is a bar chart showing variation in holding force with heating and cooling cycle temperature. The testing protocol (stretch hood relaxation test) for assessing the effect of heating and cooling cycles was as follows:

The relaxation test was performed using a test jig equipped with two vertically spaced horizontal bars. The upper bar is movable vertically to apply a predetermined elongation to the film, which is attached to the bars in the form of a sleeve 50 mm wide by 100 mm long. The lower bar is attached to a strain gauge to measure the force acting on the film and the force is recorded using a data-logger. The test at elevated temperature is performed by putting the whole test jig into a hot-air heated oven at the desired temperature. To simulate the initial force acting on a shrink film, the film is pre-tensioned to 3% elongation which corresponds to the tension typically found in commercially used pallet shrink film. The predetermined elongation applied to the film as tested was developed by stretching by an initial 75% and then allowing the film to relax back to 60%. The jig can be subjected to the desired heating and cooling cycles to record the increase or decrease from the initial tension.

The data, reflected in FIG. 4, are in Table 10. Firstly with 150 micron LDPE based shrink film shown at A, the holding force upon heating to 60° C. drops drastically to a fraction of the initial holding force at room temperature. There is a limited recovery upon cooling. At subsequent cycles the holding force deteriorates further. All this necessitates the use of a thicker film than would otherwise be the case. The film shown at B is a high EVA (18 wt % VA) with EXCEED surface layers coextruded to a film of 80 microns thick. In this case after an initial drastic drop in holding force upon heating to 60° C., the holding force drops further upon subsequent cooling to ambient temperature. The film has to be of sufficient thickness to accommodate the loss in holding force. The film at C corresponds to film 5 in Table 12 but with a reduced thickness of 80 microns. In this case, the losses in holding force are reduced over films A and B. However they are still significant. Film D is according the invention and corresponds to film 1 in Table 12 but with a reduced thickness to 80 micron. In this case there is still a loss of holding force upon heating to 60° C. For a given thickness the film D provides a better holding force at 60° C. than film C, which performance is maintained during subsequent heating and cooling cycles, leading to a marked superiority after repeated heating and cooling cycles.

TABLE 13

| | Retained Force (N/50 mm) | | | | |
|---|---|---|---|---|---|
| Temperature | 23° C. | 60° C. (1st cycle) | 23° C. | 60° C. (2nd cycle) | 23° C. |
| Film: A | 18.00 | 4.50 | 10.40 | 4.10 | 9.90 |
| B | 15.00 | 7.20 | 5.40 | 6.80 | 5.30 |
| C | 17.50 | 9.50 | 8.30 | 9.00 | 7.60 |
| D | 20.20 | 11.00 | 10.40 | 11.00 | 9.80 |

A: Shrink Hood (LDPE based), 150 micron
B: Coex (EVA core layer 18% VA), 80 micron
C: Coex (EVA core 18% VA + 30% Exact 0201, 80 micron)
D: Coex (Inventive EVA core layer), 80 micron FIGS. 6A and 6B illustrate the tear propagation for the different films in Table 12. As an indication of the weight saving in the hood which is available with the invention, Film 1 according to the invention and Reference 1 can be compared. It should be noted that at 100% stretch, the tear propagation for Reference 1 is bad. In practice that means that it can only be stretched to a level well below 100% so as to preserve package integrity in the event of a film puncture and subsequent tear propagation. In turn the reduced degree of stretch for Reference 1 which is compatible with package integrity means that the holding force for a given film weight would be reduced. Thus a thicker film must be used. In addition the comparison shows that even ignoring the requirement for package integrity the film according to the invention gives a higher holding force for the same film weight.

The Examples according to the invention have "intermittent tear" characteristics in that after initial stretch, a puncture only spreads progressively step-wise if the load is increased further. In intervening zones, tear propagation can be arrested. As illustrated the intermittent tear zone starts after about 70% stretch. Reference 1 and 2 in Table 12 above suffer from progressive tear after about 60% stretch with no intervening tear-arresting plateau. Such highly stretched prior art films, if punctured while containing a load, can tear catastrophically, spilling the load. With the invention a higher degree of stretch can be safely applied.

Figure 7:
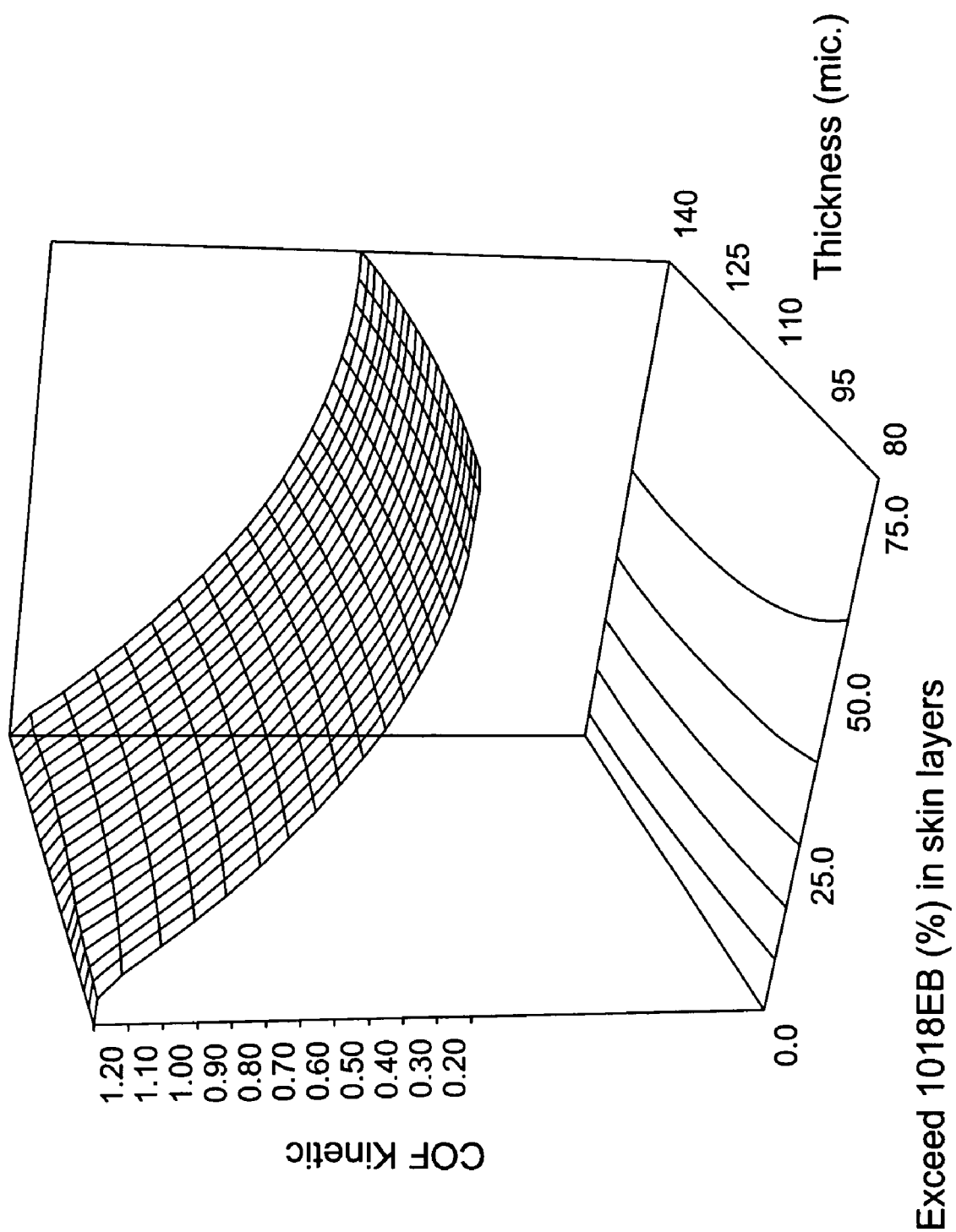
FIG. 7 shows a three dimensional graph, illustrating of the effect on Coefficient of Friction of different amounts of Exceed polymer and film thickness of films according to the invention.

FIG. 7 is a graph showing the sensitivity of the coefficient of friction with different compositions of the skin layers. With reference to FIG. 7, it is apparent that the coefficient of friction (COF) can be adapted to that required by particular stretch hood packaging machines over a broad range of from 0.2 to 1.2, spanning the preferred range of around 0.4 to 0.6, by the judicious combination of anti-block and slip agent. The desired combination can be achieved by the use of a mixture of existing metallocene derived LLDPE grades with inherently low blocking characteristics. The performance is stabilized by the matching inclusion of such additives that are migratable (such as the slip agent) in the core layer. FIG. 7 also shows that COF is substantially constant over a broad range of thicknesses, which indicates the film to have very good machine performance. This has the added advantage that the need to reformulate or to adjust the skin layer composition, for different thicknesses, is reduced.

The data on the coefficient of friction as shown in FIG. 7 were developed by means of a designed experiment (4 factors, 3 levels) in which was studied the effect on coefficient of friction of four parameters [(a) antiblock added in addition to the amount already present in the additivated polymer component of the skin layer, (b) film thickness, (c) plastomer level in core layer and (d) amount of slip- and antiblock-additivated Exceed-1018EB (as a percentage of total additivated and unadditivated (Exceed 1018CA) polymer in the skin layer)]. The films to be tested were produced by the method and equipment described with reference to Table 8 with a layer distribution of A=20%, B=60%, C=20%. The coefficient of friction (COF) was measured following ASTM D1894. A series of films to be tested was formed used various combinations of the four parameters mentioned above, each parameter being employed at three levels. These levels were: (a) 0, 2500, 5000 ppm, anti-block (b) 80, 110, 140 micron, film thickness (c) 0, 37.5, 75%, additivated Exceed EB (d) 0, 15, 30% plastomer. The data were analyzed using a Design of Experiment software package (DesignExpert). FIG. 7 is a statistical model derived from the results obtained in the designed experiments and represents films where the antiblock level (a) is at 1250 ppm; and the plastomer level in the core layer (c) is zero. The figure shows the kinetic COF performance of the films as parameters (b) and (c) are varied.

The impact of higher stretch and thinner films, as well as better preservation of the holding force as a result of temperature variations, can be exploited to provide savings in amount of polymer consumed per palletized load in excess of 50% over prior art films for containing palletized loads. Wash boarding can be minimized, especially if thicker films are desired by the use of an EVA with a low VA content and high SCB content and/or the admixture of EXACT and/or the use of an LLDPE containing LCB. Such steps render the tensile curve positive or less negative over a greater degree of film stretch.

The benefits of the films of the invention and the optimized EVA described herein can be exploited in wide variety of ways. While the invention has been described against the background of stretch hood packaging requirements, the unique characteristics of the EVA may also be suitable for the modification of the performance of shrink hood film or stretch wrap films as well as other film applications. In the field of stretch hood packaging the improved characteristics may be exploited to lower the cost of packaging by reducing the weight of films used by employing thinner and/or more highly stretched films. The improved characteristics may also be employed to strengthen the holding force, transparency etc.

so as to qualify stretch hood packaging films for more demanding applications where until now their performance had not been sufficient.

We claim:

1. Polymer comprising units derived from ethylene, said polymer having:
   a) a Melt Index of from 0.05 to 20 g/10 min, as determined by ASTM-1238 Condition E;
   b) at least 10 per 1000 C-atoms of C1- to C5 short chain branches as determined by C13 NMR, and 1 to 3.5 mol % of units derived from a copolymerizable ethylenically unsaturated ester;
   c) a density of from 0.90 to 0.94 g/cm$^3$, as determined by ASTM D1505, and
   d) a rheological relaxation time of at least 10 s,
wherein the polymer is obtained by free radical polymerization using an α-olefin chain transfer agent.

2. Polymer as claimed in claim 1 which contains at least four short chain branches per thousand carbon atoms containing three carbon atoms or less.

3. Polymer as claimed in claim 1 which contains at least five short chain branches per thousand carbon atoms containing three carbon atoms or less.

4. Polymer as claimed in claim 1 which contains less than 30 per 1000 C-atoms of short chain branches, containing five carbon atoms or less, as determined by C13 NMR.

5. Polymer as claimed in claim 1 which contains less than 20 per 1000 C-atoms of short chain branches, containing five carbon atoms or less, as determined by C13 NMR.

6. Polymer as claimed in claim 1 wherein the copolymerizable ethylenically unsaturated ester comprises ethylene vinyl acetate.

7. Polymer as claimed in claim 1 wherein the polymer contains at least 1 per 1000 C-atoms of all long chain branches, containing 6 or more carbon atoms as determined by C13 NMR.

8. Polymer as claimed in claim 1 wherein the polymer contains at least 5, per 1000 C-atoms of all long chain branches, containing 6 or more carbon atoms as determined by C13 NMR.

9. Polymer as claimed in claim 1 wherein the polymer contains from 1 to 3 mol % of units derived from a copolymerizable ethylenically unsaturated ester and at least 1 per 1000 C-atoms of all long chain branches, containing 6 or more carbon atoms as determined by C13 NMR.

10. Polymer as claimed in claim 1 wherein the polymer has a bimodal molecular weight distribution as determined by GPC DRI.

11. Polymer as claimed in claim 1 wherein the polymer has a relaxation time is less than 20 s.

12. Polymer as claimed in claim 1 wherein the polymer has a Melt Index of less than 15 g/10 min.

13. Polymer as claimed in claim 1 wherein the polymer has a Melt Index of less than 10 g/10 min.

14. Polymer as claimed in claim 1 wherein the polymer has a Melt Index of from 0.1 to 4 g/10 min for blown film extrusion.

15. Polymer as claimed in claim 14 wherein the polymer has a Melt Index of less than 2 g/10 min.

16. Polymer as claimed in claim 14 wherein the polymer has a Melt Index of less than 1 g/10 min.

17. Polymer as claimed in claim 1 wherein the density is 0.91 to 0.935 g/cm$^3$.

18. Polymer as claimed in claim 1 wherein the density is 0.92 to 0.93 g/cm$^3$.

19. Polymer, comprising units derived from ethylene, obtained by free radical polymerization using a chain transfer agent that incorporates into the polymer chain to provide a polymer having a Melt Index of from 0.05 to 20 g/10 min as determined by ASTM-D 1238 Condition E; less than 3.5 mol % of units derived from a copolymerizable ethylenically unsaturated ester; and at least 10 per 1000 C-atoms of short chain branches, containing five carbon atoms or less, as determined by C13 NMR, wherein the chain transfer agent is an α-olefin, and in which the polymer is produced in a tubular reactor under circumstances to favor LCB formation in a downstream part of the tubular reactor and has a density of from 0.90 to 0.94 g/cm$^3$.

20. Polymer as claimed in claim 19 wherein the chain transfer agent that incorporates into the polymer chain is propylene.

21. Polymer as claimed in claim 19, wherein the copolymerizable ethylenically unsaturated ester comprises ethylene vinyl acetate.

22. Polymer according to claim 19 in which the polymer has a density of 0.91 to 0.935 g/cm$^3$ as determined by ASTM D1505, and a relaxation time as described herein of at least 10 s.

23. Polymer according to claim 19 in which the polymer has a density of 0.92 to 0.93 g/cm$^3$ as determined by ASTM D1505.

24. Polymer as claimed in claim 19, comprising from 1 to 3.5 mol % of units derived from a copolymerizable ethylenically unsaturated ester.

* * * * *